(12) United States Patent
Ruan

(10) Patent No.: US 12,484,552 B1
(45) Date of Patent: Dec. 2, 2025

(54) SNACK PUZZLE DOG TOY

(71) Applicant: Shenzhen Aoqun Intelligent Manufacturing Technology Co., Ltd., Guangdong (CN)

(72) Inventor: Mengfan Ruan, Ji' an (CN)

(73) Assignee: Shenzhen Aoqun Intelligent Manufacturing Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/954,460

(22) Filed: Nov. 20, 2024

(30) Foreign Application Priority Data

Nov. 6, 2024 (CN) .......................... 202422701669.5

(51) Int. Cl.
*A01K 15/02* (2006.01)

(52) U.S. Cl.
CPC .................................. *A01K 15/025* (2013.01)

(58) Field of Classification Search
CPC .... A01K 15/025; A01K 15/02; A01K 5/0114; A01K 5/0233; A63F 9/0601
See application file for complete search history.

(56) References Cited

U.S. PATENT DOCUMENTS

| | | | | |
|---|---|---|---|---|
| 9,049,840 B1 * | 6/2015 | Parness | ................. | A01K 5/0114 |
| 12,127,534 B1 * | 10/2024 | Quick | .................. | A01K 5/0291 |
| 2011/0253059 A1 * | 10/2011 | Wong | ................... | A01K 15/025 |
| | | | | 119/702 |
| 2013/0255579 A1 * | 10/2013 | Sharpe | ................... | A01K 15/02 |
| | | | | 119/51.01 |
| 2014/0224185 A1 * | 8/2014 | Hansen | ................ | A01K 15/025 |
| | | | | 119/710 |
| 2014/0251231 A1 * | 9/2014 | Hansen | ................ | A01K 15/025 |
| | | | | 119/710 |
| 2021/0176957 A1 * | 6/2021 | List | ....................... | A01K 5/0275 |
| 2023/0389516 A1 * | 12/2023 | Qiu | ...................... | A01K 5/0114 |
| 2024/0081283 A1 * | 3/2024 | Franklin | .................. | A01K 5/02 |
| 2024/0365751 A1 * | 11/2024 | Wilson | ................. | A01K 15/025 |
| 2024/0381844 A1 * | 11/2024 | Salyer | ................... | A01K 5/0233 |
| 2024/0415094 A1 * | 12/2024 | Li | ......................... | A01K 5/0114 |

* cited by examiner

*Primary Examiner* — Trinh T Nguyen
(74) *Attorney, Agent, or Firm* — Millen, White, Zelano & Branigan P.C.; William F. Nixon

(57) ABSTRACT

The disclosure discloses a snack puzzle dog toy and relates to the field of pet toys. The snack puzzle dog toy includes a base, where a base plate is arranged along the circumference at a lower part of the base. A food container is arranged in the base in up-and-down slide fit, and the base plate is provided with a side press button for driving the food container to slide up and down. The food container is provided with first food outlets, the base is provided with second food outlets, and the base plate is provided with food boxes at positions corresponding to the second food outlets. By pressing on a side to let food out, the food container slides upwards and the amount of pet food can be seen. The food will not get stuck at the food outlets, and the food container is prevented from getting stuck.

15 Claims, 8 Drawing Sheets

SNACK PUZZLE DOG TOY

TECHNICAL FIELD

The disclosure relates to the field of pet toys, and specifically relates to a snack puzzle dog toy.

BACKGROUND

Pet feeding toys are used for feeding pets. In existing press feeders, food gets out by pressing downwards from the middle. When pressing down, it's difficult to press on the center point. Therefore, when a food container slides up and down, food gets stuck easily, resulting in the food container getting stuck and thus inconvenience in use.

SUMMARY

The objective of the disclosure is to provide a snack puzzle dog toy to solve the aforementioned problems.

The disclosure achieves the objective by the following technical solutions:
 a snack puzzle dog toy includes a base, wherein a base plate is arranged along the circumference at a lower part of the base, a food container is arranged in the base in up-and-down slide fit, and the base plate is provided with a side press button for driving the food container to slide up and down; and
 the food container is provided with first food outlets, the base is provided with second food outlets, the base plate is provided with food boxes at positions corresponding to the second food outlets, and when the food container slides upward to a position where the first food outlets correspond to the second food outlets, food enters the food boxes through the outlets.

In some implementations, an upper cover is arranged above the base, and a lower cover is arranged below the base plate.

In some implementations, the food container and the base are both regular polygons.

In some implementations, a plurality of food chutes are arranged in the food container, and each food chute corresponds to one first food outlet; and
 a number and positions of the second food outlets correspond to a number and positions of the first food outlets.

In some implementations, the base plate is provided with food troughs along the circumference corresponding to each second food outlet respectively, food covers are hinged to the food troughs, and the food covers are fitted with the food troughs to form the food boxes.

In some implementations, the base plate is provided with an installation trough, and the side press button is installed in the installation trough.

In some implementations, the side press button is connected to the bottom of the food container through a lever rod.

In some implementations, a roller bracket is formed at the bottom of the food container, a roller is arranged on the roller bracket, and an end of the lever rod slides in contact with the roller to lever the food container up.

In some implementations, a limiting part for restricting a rising height of the food container is arranged on an inner side of the base.

In some implementations, the lever rod includes a short rod part and a long rod part which have an included angle.

In some implementations, the long rod part is arc-shaped.

In some implementations, an avoidance gap is formed on the food container at a position corresponding to the lever rod, and a first U-shaped part is arranged at the avoidance gap and fixedly connected to the bottom of the base plate; and
 the position where the short rod part meets the long rod part is hinged to the first U-shaped part.

In some implementations, a second U-shaped part is arranged below the side press button, and an end of the short rod part is clamped in the second U-shaped part.

In some implementations, a plurality of non-slip mats are arranged below the lower cover.

In some implementations, the base plate is further provided with a feeding trough.

The present application has the following beneficial effects: by pressing on a side to let food out, the food container slides upwards and the amount of pet food can be seen, the food will not get stuck at the food outlets, and the food container is prevented from getting stuck.

Figure 1:
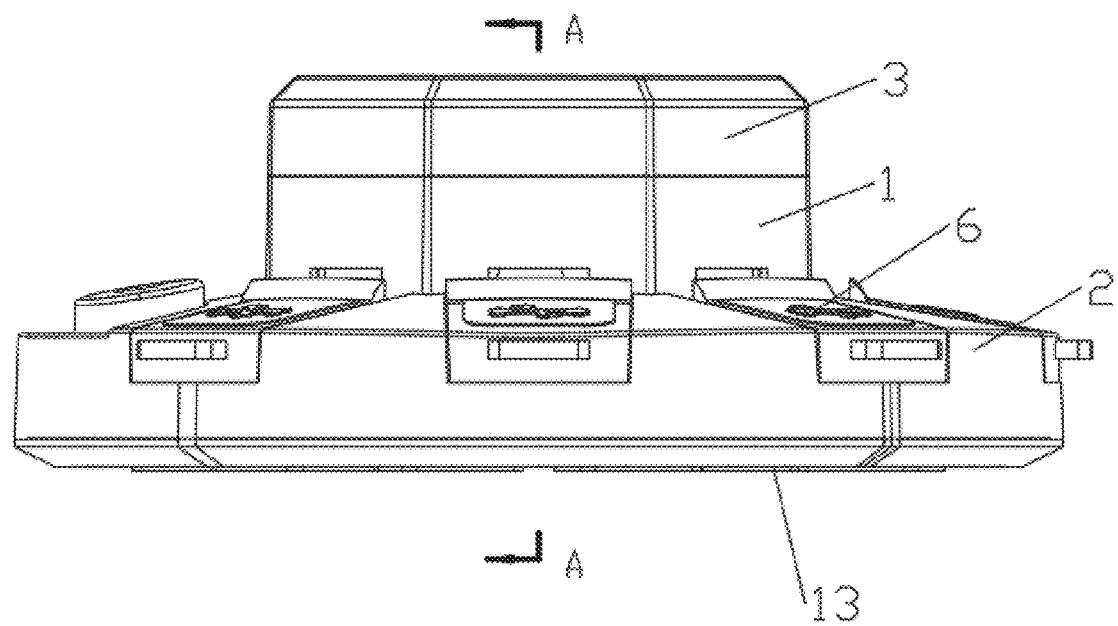
FIG. 1 is a front structural diagram of the disclosure.
Figure 2:
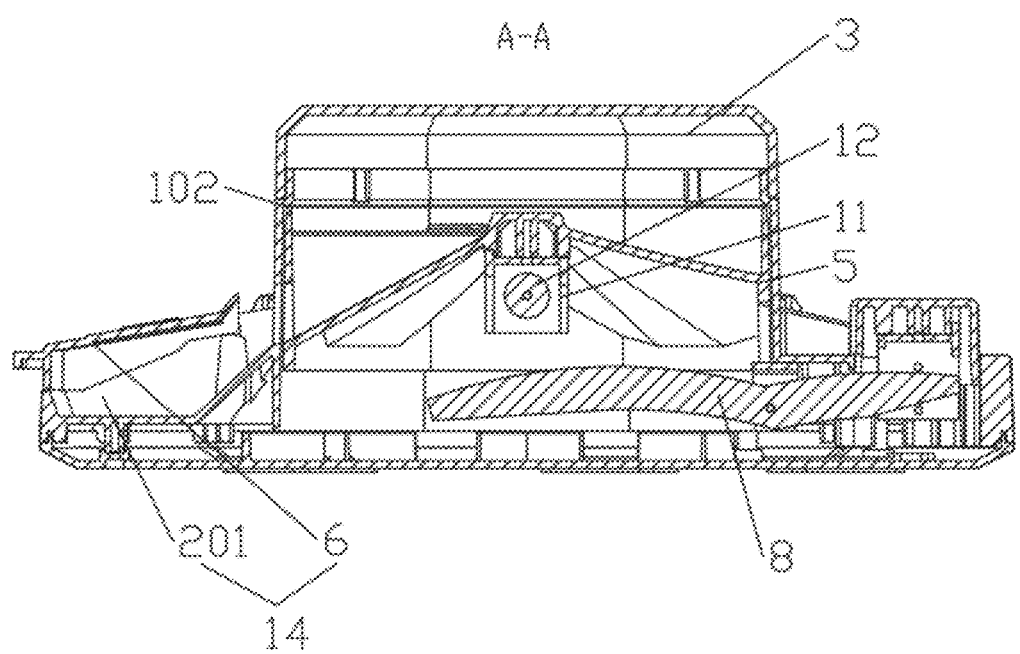
FIG. 2 is an A-A section view of FIG. 1.

REFERENCE SYMBOLS IN THE DRAWINGS 1. base; 101. second food outlet; 102. limiting part; 2. base plate; 201. food trough; 202. installation trough; 203. feeding trough; 3. upper cover; 4. lower cover; 5. food container; 501. first food outlet; 502. food chute; 6. food cover; 7. side press button; 8. lever rod; 801. long rod part; 802. short rod part; 9. second U-shaped part; 10. first U-shaped part; 11. roller bracket; 12. roller; 13. non-slip mat, and 14. food boxes.

DETAILED DESCRIPTION

As shown in FIG. 1 to FIG. 8, the disclosure provides a snack puzzle dog toy, including a base 1, where a base plate 2 is arranged along the circumference at a lower part of the base 1. A food container 5 is arranged in the base 1 in up-and-down slide fit, and the base plate 2 is provided with a side press button 7 for driving the food container 5 to slide up and down. The food container 5 can be driven to rise by the side press button 7. The food container 5 is provided with first food outlets 501, the base 1 is provided with second food outlets 101, and the base plate 2 is provided with food boxes 14 at positions corresponding to the second food outlets 101. When the food container 5 slides upward to a position where the first food outlets 501 correspond to the second food outlets 101, food enters the food boxes through the outlets.

In the above solution, by pressing the side press button 7, the food container 5 is lifted up through the lever rod 8, so that the first food outlets 501 of the food container 5 correspond to the second food outlets 101, and food in the food container 5 slides into the food boxes 14 along food chutes and can be used for feeding through the food boxes 14. By pressing on a side of the food container 5 to let food out, the amount of food can be seen, and the food container 5 can be prevented from getting stuck, providing more convenience in use.

In some implementations, an upper cover 3 is arranged above the base 1, a lower cover 4 is arranged below the base plate 2, and the upper cover 3 is connected to the food container 5 in a clamping manner.

Figure 8:
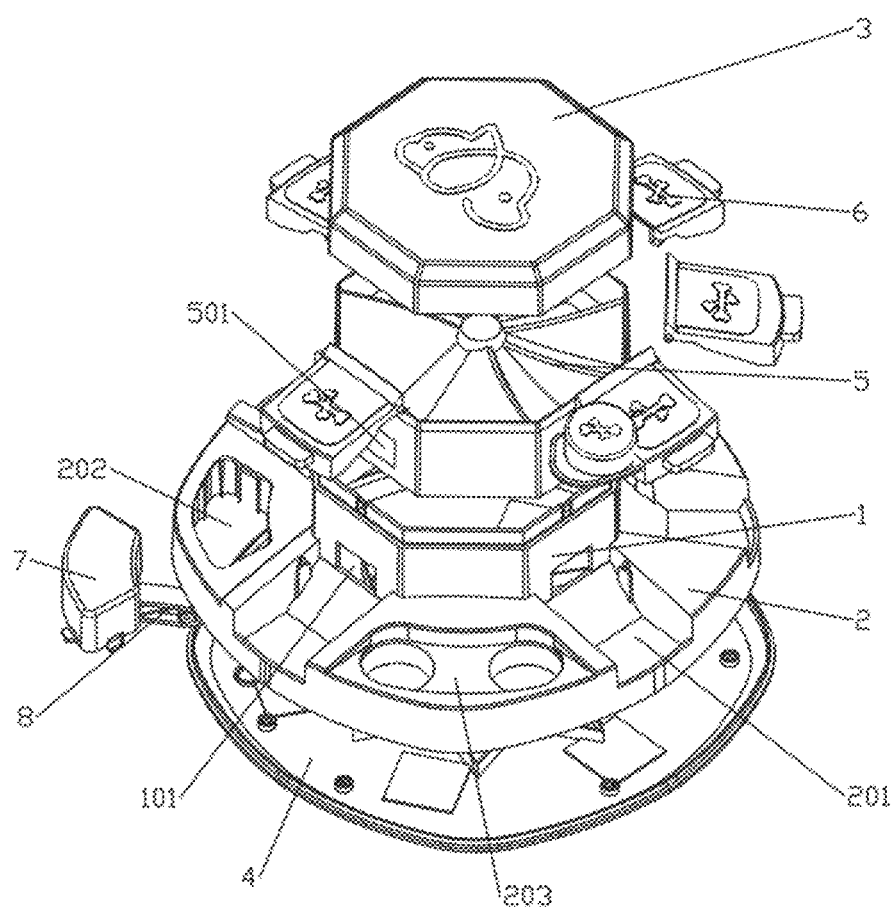
FIG. 8 is an exploded view of the disclosure.

In some implementations, as shown in FIG. 8, the food container 5 and the base 1 are both regular polygons, and the food container 5 is nested inside the base 1 in a sliding manner. The regular polygon structure can prevent rotation and has a limiting effect. A plurality of food chutes 502 are arranged in the food container 5, and each food chute 502 corresponds to one first food outlet 501. A number and positions of the second food outlets 101 correspond to a number and positions of the first food outlets 501. Pet food in the food container 5 can slide into the food boxes 14 along the food chutes 502.

Figure 3:
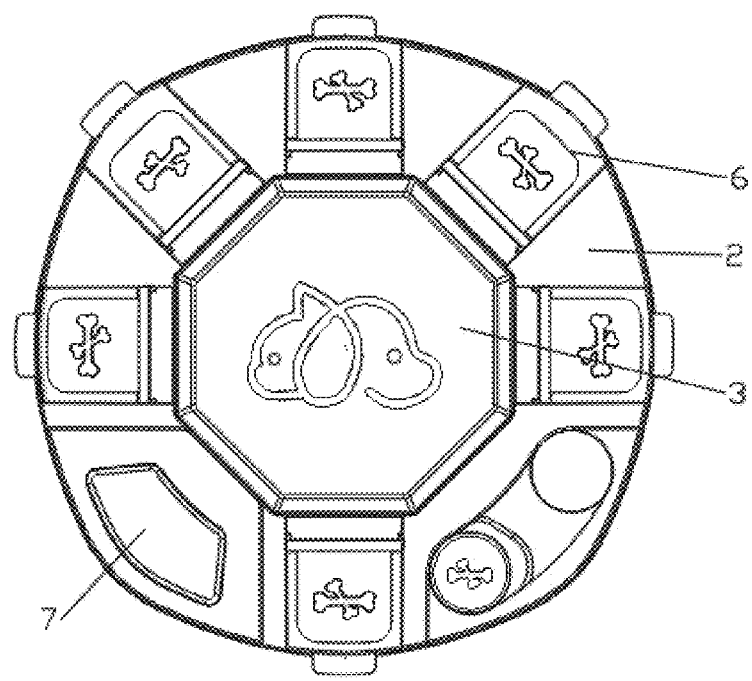
FIG. 3 is a top view of the disclosure.
Figure 4:
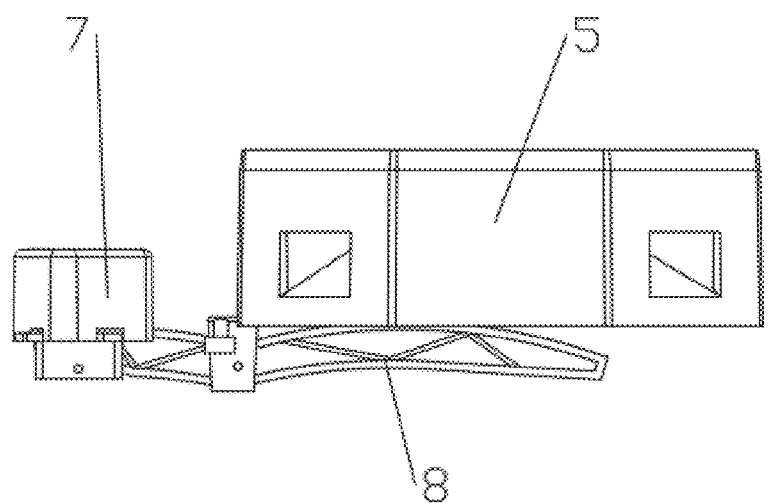
FIG. 4 is a front structural diagram of a food container fitted with a side press button of the disclosure.
Figure 5:
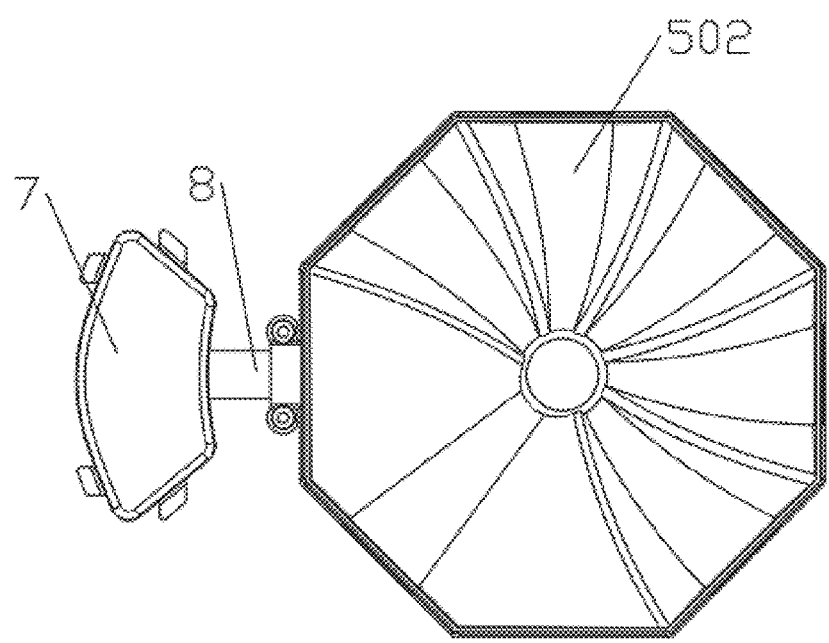
FIG. 5 is a top structural diagram of a food container fitted with a side press button of the disclosure.

In some implementations, as shown in FIG. 3, the base plate 2 is provided with food troughs 201 along the circumference corresponding to each second food outlet 101 respectively, food covers 6 are hinged to the food troughs 201, and the food covers 6 are fitted with the food troughs 201 to form the food boxes 14.

In some implementations, as shown in FIG. 8, the base plate 2 is provided with an installation trough 202, and the side press button 7 is installed in the installation trough 202. The side press button 7 is connected to the bottom of the food container 5 through a lever rod 8.

A roller bracket 11 is formed at the bottom of the food container 5, a roller 12 is arranged on the roller bracket 11, and an end of the lever rod 8 slides in contact with the roller 12 to lever the food container 5 up.

Figure 6:
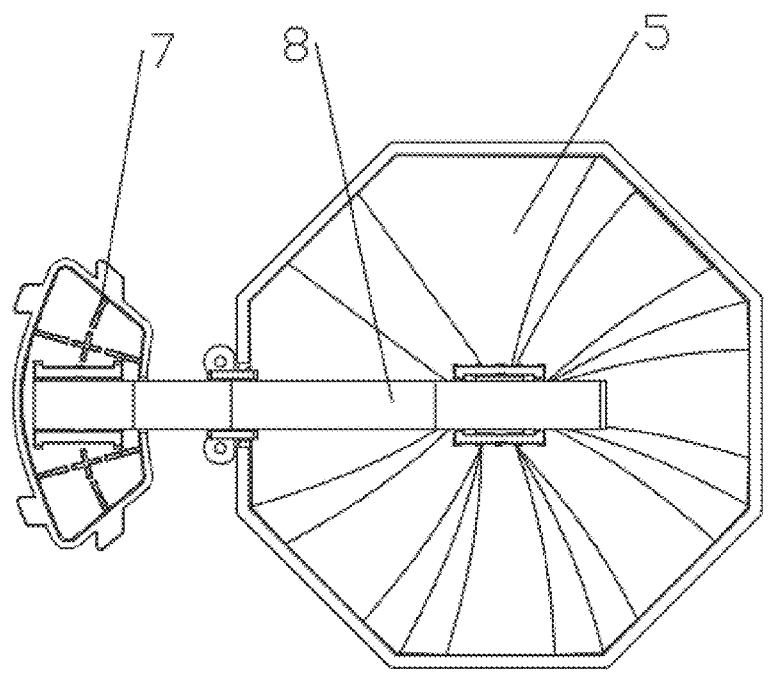
FIG. 6 is a bottom structural diagram of a food container fitted with a side press button of the disclosure.
Figure 7:
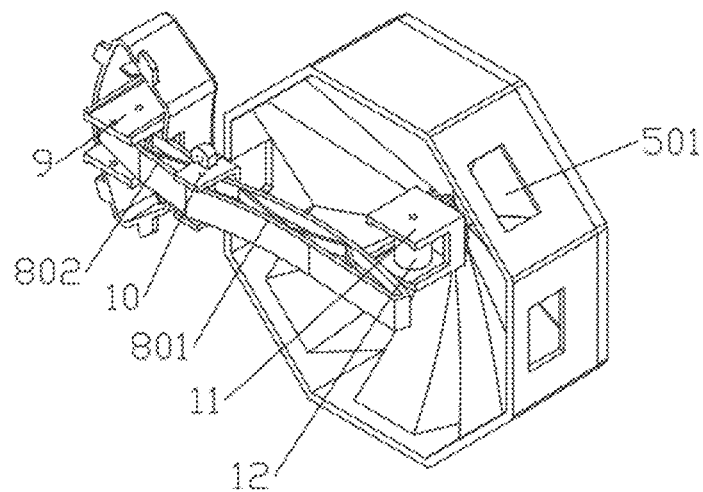
FIG. 7 is a three-dimensional view of a food container fitted with a side press button of the disclosure.

Specifically, as shown in FIG. 6, the lever rod 8 includes a short rod part 802 and a long rod part 801 which have an included angle, and the long rod part 801 is arc-shaped.

In some implementations, a limiting part 102 for restricting a rising height of the food container 5 is arranged on an inner side of the base 1.

Further, an avoidance gap is formed on the food container 5 at a position corresponding to the lever rod 8, and a first U-shaped part 10 is arranged at the avoidance gap and fixedly connected to the bottom of the base plate 2. The position where the short rod part 802 meets the long rod part 801 is hinged to the first U-shaped part 10. A second U-shaped part 9 is arranged below the side press button 7, and an end of the short rod part 802 is clamped in the second U-shaped part 9. Such a structure can facilitate the side press button 7 to lift the food container 5 up through the lever rod 8.

To prevent the pet toy from sliding, a plurality of non-slip mats 13 are arranged below the lower cover 4.

In some implementations, the base plate 2 is further provided with a feeding trough 203 for facilitating direct feeding.

What is claimed is:

1. A snack puzzle dog toy, comprising a base, wherein a base plate is arranged along the circumference at a lower part of the base, a food container is arranged in the base in up-and-down slide fit, and the base plate is provided with a side press button for driving the food container to slide up and down; and the food container is provided with first food outlets, the base is provided with second food outlets, the base plate is provided with food boxes at positions corresponding to the second food outlets, and when the food container slides upward to a position where the first food outlets correspond to the second food outlets, food enters the food boxes through the outlets.

2. The snack puzzle dog toy according to claim 1, wherein an upper cover is arranged above the base, and a lower cover is arranged below the base plate.

3. The snack puzzle dog toy according to claim 1, wherein the food container and the base are both regular polygons.

4. The snack puzzle dog toy according to claim 3, wherein a plurality of food chutes are arranged in the food container, and each food chute corresponds to one first food outlet; and
 a number and positions of the second food outlets correspond to a number and positions of the first food outlets.

5. The snack puzzle dog toy according to claim 4, wherein the base plate is provided with food troughs along the circumference corresponding to each second food outlets respectively, food covers are hinged to the food troughs, and the food covers are fitted with the food troughs to form the food boxes.

6. The snack puzzle dog toy according to claim 5, wherein the base plate is provided with an installation trough, and the side press button is installed in the installation trough.

7. The snack puzzle dog toy according to claim 6, wherein the side press button is connected to the bottom of the food container through a lever rod.

8. The snack puzzle dog toy according to claim 7, wherein a roller bracket is formed at the bottom of the food container, a roller is arranged on the roller bracket, and an end of the lever rod slides in contact with the roller to lever the food container up.

9. The snack puzzle dog toy according to claim 8, wherein a limiting part for restricting a rising height of the food container is arranged on an inner side of the base.

10. The snack puzzle dog toy according to claim 7, wherein the lever rod comprises a short rod part and a long rod part which have an included angle.

11. The snack puzzle dog toy according to claim 10, wherein the long rod part is arc-shaped.

12. The snack puzzle dog toy according to claim 10, wherein an avoidance gap is formed on the food container at a position corresponding to the lever rod, and a first U-shaped part is arranged at the avoidance gap and fixedly connected to the bottom of the base plate; and
 the position where the short rod part meets the long rod part is hinged to the first U-shaped part.

13. The snack puzzle dog toy according to claim 12, wherein a second U-shaped part is arranged below the side press button; and
 an end of the short rod part is clamped in the second U-shaped part.

14. The snack puzzle dog toy according to claim 2, wherein a plurality of non-slip mats are arranged below the lower cover.

15. The snack puzzle dog toy according to claim 1, wherein the base plate is further provided with a feeding trough.

* * * * *